April 13, 1965 R. F. MANKE 3,178,148
VEHICLE SEAT SUSPENSIONS
Filed May 1, 1963 3 Sheets-Sheet 1

INVENTOR.
RAYMOND F. MANKE.
BY
Emerson B Donnell

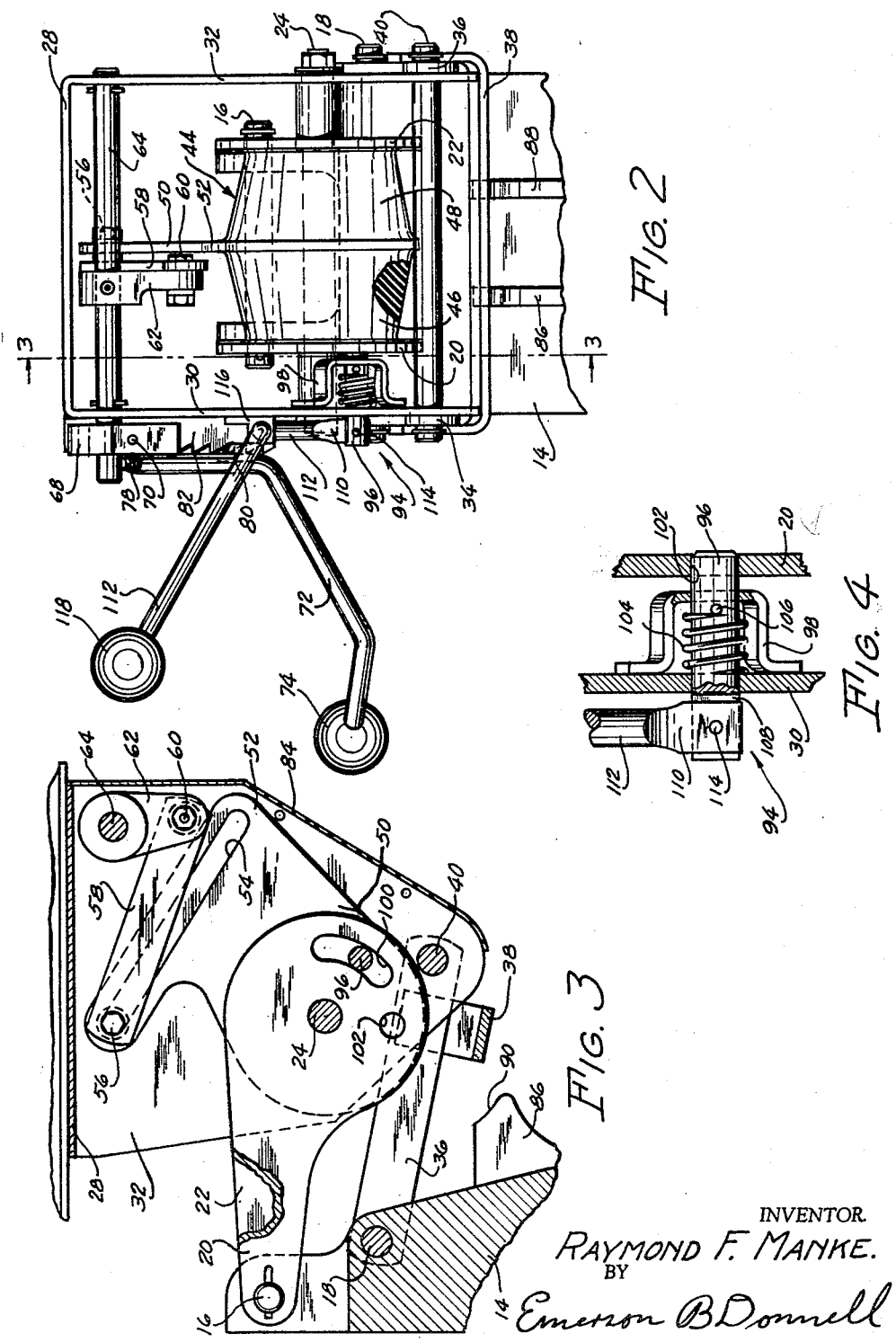

April 13, 1965 R. F. MANKE 3,178,148
VEHICLE SEAT SUSPENSIONS
Filed May 1, 1963 3 Sheets-Sheet 3
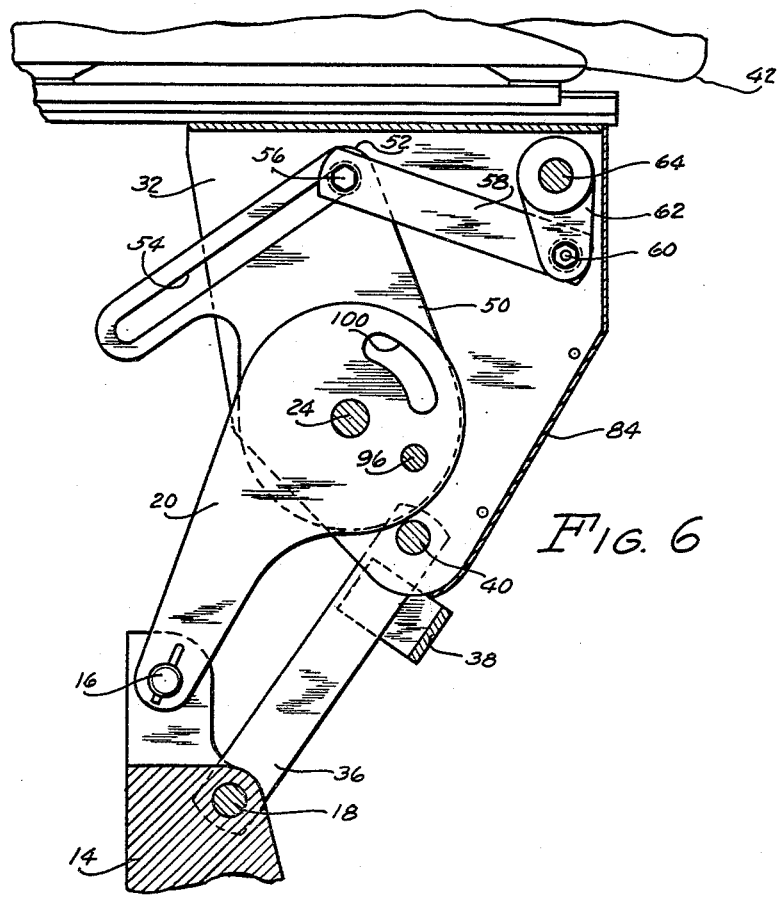
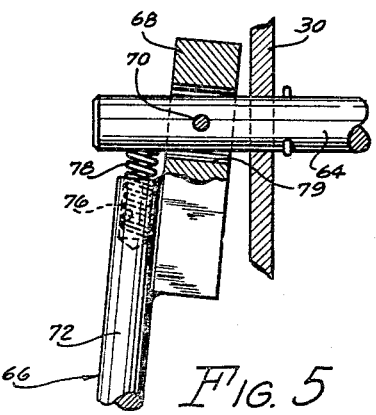
INVENTOR.
RAYMOND F. MANKE
BY
Emerson B Donnell

United States Patent Office 3,178,148
Patented Apr. 13, 1965

3,178,148
VEHICLE SEAT SUSPENSIONS
Raymond F. Manke, Racine, Wis., assignor to J. I. Case
Company, Racine, Wis., a corporation of Wisconsin
Filed May 1, 1963, Ser. No. 277,321
20 Claims. (Cl. 248—399)

The present invention relates to seat suspensions, and particularly to those adapted for use on vehicles such as tractors, trucks, and the like, which tend to be rough riding so that it is desirable that the seat be resiliently supported to cushion the operator and shield him from the jolts insofar as practicable.

Such seat suspensions have been devised in which the seat is carried on generally horizontal, substantially parallel links, which may swing downwardly under the weight of the operator, the downward movement being resisted by some sort of a spring arrangement. Torsional elements have been used to resist swinging of one of the links, and adjustable means are known for introducing initial torsion into the torsional elements so that the resistance to downward swinging may be readily made proportional to the weight of the rider.

It is often desirable to be able to shift, retract, or displace a tractor seat a substantial amount so that the operator may stand and operate the machine when convenience or requirements dictate. Various expedients of more or less complication have been devised for accomplishing this last objective, and a link suspension of the type outlined can be used to obtain not only the desirable yielding or resilient support, but also the capability of retracting the seat, or throwing it back out of the way so that the operator may stand, or stand and lean back against it when he desires.

A principal object of the invention is to generally improve seat suspensions of the type disclosed, particularly in the direction of facility of adjustment and general adaptability to the purposes desired. A particular object is to provide such a link suspension which is adjustable for accommodating operators of different weights, and which has an operating position, and a retracted position. The device may be arranged to provide means for locking the linkage in its operating position wherein it may play up and down a predetermined limited amount, and for locking it in a retracted position in which the seat is substantially displaced from its normal operating or active position, and in which it is held substantially rigidly against any displacement, and out of the way to permit standing operation of the vehicle, as aforesaid.

Further objects and advantages will become apparent as the device is disclosed in the specification.

In the drawings:

FIG. 2 is a front view of the same with parts removed;

FIG. 3 is an enlarged vertical sectional view, taken substantially on the line 3—3 of FIG. 2;

FIG. 4 is an enlarged detail of certain locking mechanism shown in FIGS. 1 and 2, in section on the line 4—4 of FIG. 1, with the parts in a different position;

FIG. 5 is an enlarged detail of certain adjusting mechanism shown in FIGS. 1 and 2, in section on the line 5—5 of FIG. 1; and FIG. 6 is a view similar to FIG. 3, but showing the parts in a different position.

Figure 1:
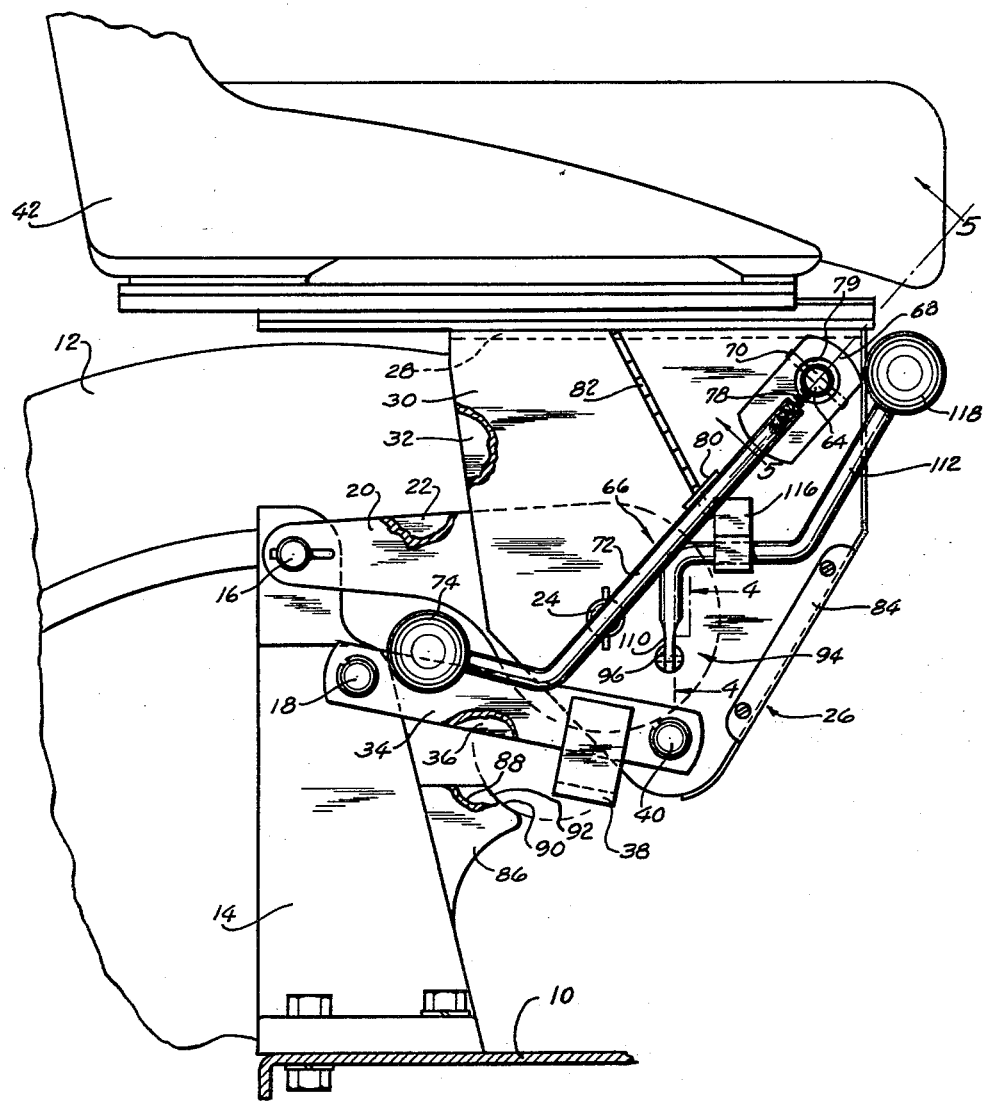
FIG. 1 is a side elevation of a seat suspension of the type contemplated, including a fragment of a tractor on which the device is mounted.

Similar reference characters have been applied to the same parts throughout these drawings, and the accompanying specification, in which a preferred embodiment is disclosed. However, it is to be understood that variations on the structure illustrated may occur to those skilled in the art, and the invention is not to be taken as limited except as defined by the claims.

The device, as stated, is mounted on a tractor, the platform 10 of which, and a fragment of one fender 12, is shown in FIG. 1. A standard 14 is mounted on platform 10 in any suitable manner so as to be substantially rigid therewith, and provides an upper pivot 16, and a lower pivot 18, spaced upwardly from platform 10. A pair of upper links 20 and 22 are journaled on pivot 16 and extend generally forwardly to a pivot 24 on a box-like seat support, generally designated as 26, and comprising an upper plate-like portion 28 and spaced downwardly extending side plates or portions 30 and 32. The device as so far described would be unstable, and as a stabilizing means, a second pair of links 34 and 36 are journaled on pivot 18, and extend generally forwardly, substantially parallel to links 20 and 22. They are connected to each other by a stabilizing bail 38 and pivoted to sides 30 and 32 by a pivot 40, as further disclosed in FIG. 2, the whole comprising a parallelogram linkage which provides guided up-and-down movement of seat support 26.

Thus, a construction has been provided by which seat support 26 may play up and down by swinging of links 20, 22, 34 and 36, in relation to standard 14.

A seat pan or body of any suitable type 42 is mounted in any preferred manner on plate portion 28, and to support the weight of the parts and an operator on seat pan 42, a resilient member in the form of a torsion element 44 of rubber or rubber-like material is provided, and has a block portion 46 suitably fixed, as by bonding to an enlarged portion of above-mentioned link 20. Torsion element 44 also has a block 48 which, in similar manner, is fixed to link 22. Blocks 46 and 48 are fixed, as for example by bonding, to opposite sides of a plate or anchorage 50 which constitutes part of a lost motion linkage to be presently described. Links 20 and 22 together with blocks 46 and 48 as well as plate 50, are journaled on above-mentioned pivot 24, and it will be apparent that up-and-down movement of seat support 26 and swinging of links 20 and 22 will cause a certain amount of rotation of blocks 46 and 48 about pivot 24. If it is assumed that anchorage 50 is held against such rotation, the aforesaid movement will introduce a twist or torsional distortion into blocks 46 and 48 so that they will resist such movement and tend to maintain seat support 26 against downward movement caused by a predetermined weight or load.

In practice anchorage 50 is so held and may be adjusted, or rotated as will be described, which action will predetermine the twist or torsion in blocks 46 and 48, to balance the weight of the operator on seat 42. The seat may play up and down, or more properly, the standard 14 may jolt up and down with the tractor, while the seat and the operator ride in a relatively smooth and even manner by virtue of the swinging of the links 20, 22, 34, and 36, and the twisting and untwisting of blocks 46 and 48.

Plate 50, as more particularly seen in FIG. 3, has an upwardly directed portion 52 which provides a relatively long slot 54 in which is engaged a pin or bolt 56, forming a pin-and-slot connection between plate 50 or portion 52, and a bar or compression link 58. Link 58 extends generally forwardly to a pivot 60 which connects it with a short lever 62 fixed on a rockshaft 64. Rockshaft 64 is journaled in above-mentioned side portions 30 and 32 (FIG. 2) of seat support 26 at the upper portion thereof close to plate portion 28, and at a level approximately equivalent to plate portion 52. Rockshaft 64 is held stationary in relation to seat support 26, as will appear, except when actual adjustment is being performed.

The weight on seat 42, will tend, of course, to cause downward movement of seat support 26 coupled with clockwise rotation of link 20 about pivot 24. This will tend to rotate blocks 46 and 48 in a clockwise direction which will also tend to rotate plate 50. Portion 52 and particularly the left end of slot 54 is therefore pressed against pivot 56 with a substantial force, generally proportional to the weight on seat pan 42, and the resistance of blocks 46 and 48 to swinging of links 20 and 22 is utilized to support seat pan 42 and its load an average distance above platform 10 which will be satisfactory for the tractor operator. As will be apparent, operators of different weight will require different degrees of twist in blocks 46 and 48, in order to be supported in a suitable position within a suitable or normal range of movement of links 20, 22, 34, and 36. For this purpose, rockshaft 64 can be adjusted to various positions which will locate pivot 56 either more or less to the left, as seen in FIG. 3. Such adjustment will turn or rotate plate 50 about pivot 24 and thereby increase or decrease the torsion in blocks 46 and 48.

Shaft 64, as seen in FIG. 5 has mounted thereon, a hand lever generally designated as 66, and which includes a block 68, pivoted for rocking movement on shaft 64 by means of a pin 70. Block 68 has permanently united therewith a shank 72 which extends to a convenient position and has a knob or handle 74, FIG. 1, within reach of the occupant of seat 42. Shank 72 is provided with a pocket or recess 76 within which is compressed a spring 78 which presses upwardly against rockshaft 64 and downwardly against the bottom of recess 76. In view of the offset between spring 78 and pin 70, lever 66 is biased in a counterclockwise direction about pin 70. Block 68 is provided with generous clearance about shaft 64 at 79.

Shank 72 has a blade-like element or detent 80 which is engageable with any one of the teeth on a rack 82, FIG. 1, fixed in any suitable manner on side portion 30. If an operator gets into seat 42 and finds the response of the resilient member 44 unsuitable or not to his liking, it is a simple matter to grasp handle 74, shift blade 80 out of engagement with rack 82, and re-engage it with rack 82 in a new position, thereby rocking shaft 64 and changing the position of lever 62. This will adjust plate 50 to change the torsion in blocks 46 and 48. The adjustment is quick, convenient, and positive, and may be arrived at repeatedly by counting the teeth in rack 82 over which detent 80 passes while the adjustment is being made.

The open space between sides 30 and 32 is preferably closed by a cover plate 84 fixed in any suitable manner in relation to sides 30 and 32, thereby forming with side plates 30 and 32 a rearwardly open box-like seat support or enclosure presenting a smooth surface toward the operator, not likely to cause injury if he is thrown against it by the movements of the tractor, and against which he may lean without discomfort if he so desires.

The motions of tractors at times can be quite violent, resulting in extreme downward movement (relative to standard 14) of seat support 26, such that some sort of limit stop or check is desirable. For this purpose, bosses 86 and 88 are extended forwardly and upwardly from standard 14, and have concave forward extremities 90 and 92 positioned to be contacted by the rounded outer surfaces of blocks 46 and 48 in the event that seat support 26 becomes relatively downwardly displaced a sufficient amount. In this way, the excessive motion is arrested by a relatively soft and yielding rubber or rubber-like surface contacting bosses 86 and 88, rather than to have any type of violent metal-to-metal contact under such extreme conditions.

If the operator decides to stand while operating the tractor, he can lift the seat manually, whereupon it will swing upwardly and backwardly by swinging of links 20, 22, 34 and 36, until the links stand approximately vertical, as in FIG. 6. In this position, the seat will have moved a substantial distance back from its normal position above platform 10, and there is nothing projecting forwardly of the seat pan 42 to endanger the operator by reason of violent motion of the tractor. As the seat is thus shifted, the twist in blocks 46 and 48 is relaxed, and after predetermined movement, plate 50 will be rotated in a counterclockwise direction by reason of the rotation of the blocks, as seen in FIG. 3, a slot 54, within which pin 56 may slide, providing for this movement without interference from link 58. In the upper position of links 20 and 22, pin 56, by virtue of the movement of plate portion 52, will come to rest substantially at the other end of slot 54, as seen in FIG. 6.

Means to control the swinging movement of links 20, 22, 34 and 36 is desirable, and for this purpose a locking device generally designated as 94 includes a pin 96 slidably supported in side portion 30 and a bracket 98 (see also FIGS. 2 and 4) fixed thereon between side portion 30 and link 20. Pin 96 in the operating position of the seat extends intot a slot 100, FIG. 3, provided in link 20, and therefore does not interfere with the swinging of link 20 within desirable limits, but does encounter the lower end of the slot 100, if the seat is thrown upwardly an extensive distance by an extremely violent jolt, for example, so that the seat cannot be projected into its inoperative position accidentally. Also, when the seat is unoccupied, the torsional force of resilient member 44 may force the lower end of slot 100 into continuous contact with pin 96. In the event of a violent downward movement of the seat, it is preferable that the blocks 46 and 48 contact bosses 86 and 88 before pin 96 contacts the opposite end of slot 100, and slot 100 is preferably made long enough so that pin 96 will be clear of the upper end of slot 100 when blocks 46 and 48 are arrested by bosses 86 and 88.

Pin 96 is retractable by means which will be described, whereupon link 20 may swing to the position shown in FIG. 6, by reason of raising of seat 42, and its support 26. When seat 42 has reached a desired upper position, pin 96 becomes engaged in a hole 102 provided in link 20, thereby locking the parts against movement. Pin 96 is proportioned to prevent any substantial movement of link 20 when engaged in hole 102, as seen in FIGS. 4 and 6.

A spring 104 is disposed about pin 96, pressing against a transverse pin 106 fixed in pin 96, and reacting against side plate 30, thereby yieldingly pressing pin 96 into slot 100 or hole 102. Pin 96 has a slot 108 outwardly of side plate 30, in which is engaged a tongue portion 110 of a lever 112. Tongue portion 110 is pivoted in slot 108 on a pin 114 and is fulcrumed in the present instance in a bearing 116 fixed in any suitable manner on side plate 30. Lever 112 has a handle 118 by which it may be conveniently gripped for actuation to remove pin 96 from slot 100 or hole 102.

The operation of the device is thought to be clear from the foregoing, but by way of review, it is pointed out that the torsion blocks 46 and 48 urge links 20 and 22 to rotate in a counterclockwise direction and this action normally balances the weight of an operator on seat body 42, which weight tends to cause clockwise rotation of links 20 and 22. The two forces will come into equilibrium at some point and torsion blocks 46 and 48 may be adjusted to position the seat at a convenient height for operation of the tractor, and when so adjusted will locate pin 96 between the ends of slot 100. The seat will play up and down in this region and shield the operator from the violent jolts associated with the operation of the tractor. If the seat tends to ride too low, or too high, as a result of the weight or lack thereof of the particular operator, adjustment is effected by changing the degree of twist in blocks 46 and 48. This is easily accomplished by manipulation of lever 62, and it is to be noted that the movement of the lever, either up or down, corresponds with the direction of its effect on the seat.

When it is desired to stand to operate the tractor, the seat may be raised and thrown back out of the way by first operating lever 112 to release pin 96 from slot 100. Raising of seat 42 is then permitted without interference from blocks 46 and 48, by reason of the lost motion connection constituted by link 58 and pin 56 operating in slot 54. When so thrown back, seat 42 is maintained in position by pin 96, which also serves to limit the up-and-down movement of the seat to reasonable amounts, when the seat is in its operating position.

The rubber-like blocks 46 and 48 serve not only as a resilient member, but also as yielding or cushioning abutments or bumpers for limiting the downward movement of the seat, as the blocks contact bosses 86 and 88.

A seat is thus supplied which effectively cushions the shocks of operation of a tractor or other rough vehicle; which is readily adjusted to accommodate operators of different weights; which will not inadvertently become displaced from its normal operating range; and which may be readily shifted out of the way and so maintained when the operator wishes to stand and operate the vehicle. It is further pointed out that, when so shifted, the seat presents a minimum amount of encumbrance to the vehicle platform.

What is claimed as new and desired to be secured by Letters Patent of the United States is:

1. In a vehicle seat suspension a linkage arranged to guide a seat in a normal range of up-and-down movement for cushioning shocks, and swingable to guide said seat into an upper retracted position, resilient means connected with said seat suspension in position to support said seat in said normal range of up-and-down movement, and an anchorage for said resilient means including a lost motion connection, engaged with said resilient means and with said seat suspension whereby said seat may be swung into said retracted position without interference from said resilient means.

2. In a vehicle seat suspension a linkage arranged to guide a seat in a normal range of up-and-down movement for cushioning shocks, and swingable to guide said seat into an upper retracted position, resilient means connected with said seat suspension in position to support said seat in said normal range of up-and-down movement, an anchorage for said resilient means including a lost motion connection, engaged with said resilient means and with said seat suspension whereby said seat may be swung into said retracted position without interference from said resilient means, and locking means engaged with said linkage and securing it in said retracted position.

3. In a vehicle seat suspension a linkage arranged to guide a seat in a normal range of up-and-down movement for cushioning shocks, and swingable to guide said into an upper retracted position, resilient means connected with said seat suspension in position to exert an upward supporting force on said seat in said normal range of up-and-down movement, adjusting means connected with said resilient means for varying said upward supporting force at will, and an anchorage for said resilient means including a lost motion connection, engaged with said resilient means and with said seat suspension whereby said seat may be swung into said retracted position without intereference from said resilient means.

4. In a vehicle seat suspension a linkage arranged to guide a seat in a normal range of up-and-down movement for cushioning shocks, and swingable to guide said seat into an upper retracted position, resilient means connected with said seat suspension in position to exert an upward supporting force on said seat in said normal range of up-and-down movement, adjusting means connected with said resilient means for varying said upward supporting force at will, and anchorage for said resilient means including a lost motion connection, engaged with said resilient means and with said seat suspension whereby said seat may be swung into said retracted position without interference from said resilient means, and locking means engaged with said linkage and securing it in said retracted position.

5. In a vehicle seat suspension a linkage arranged to guide a seat in a normal range of up-and-down movement for cushioning shocks, and swingable to guide said seat into an upper retracted position, resilient means connected with said seat suspension in position to exert an upward force on said seat in said normal range of up-and-down movement, adjusting means connected with said resilient means for varying said upward supporting force at will, and an anchorage for said resilient means including a lost motion connection, engaged with said resilient means and with said adjusting means whereby said seat may be swung into said retracted position without interference from said resilient means.

6. In a vehicle seat suspension a linkage arranged to guide a seat in a normal range of up-and-down movement for cushioning shocks, and swingable to guide said seat into an upper retracted position, resilient means connected with said seat suspension in position to exert an upward supporting force on said seat in said normal range of up-and-down movement, adjusting means connected with said resilient means for varying said upward supporting force at will, an anchorage for said resilient means including a lost motion connection, engaged with said resilient means and with said adjusting means whereby said seat may be swung into said retracted position without interference from said resilient means, and locking means engaged with said linkage and securing it in said retracted position.

7. In a vehicle seat suspension of the type comprising a standard mounted on the vehicle, a link pivotally mounted on and extending generally forwardly from said standard, a seat support pivotally connected to, and supported on said link for up-and-down movement accompanied by swinging of said link, means for stabilizing said seat support, a torsion element, a portion on said torsion element fixed to said link, an anchorage fixed to said torsion element at a point spaced from said link, the combination of a lost motion connection connected to said anchorage, an adjustable element normally fixed in relation to said torsion element, and said lost motion connection being also connected to said adjustable element.

8. In a vehicle seat suspension of the type comprising a standard mounted on the vehicle, a link pivotally mounted on and extending generally forwardly from said standard, a seat support pivotally connected to, and supported on said link for up-and-down movement accompanied by swinging of said link, means for stabilizing said seat support, a torsion element, a portion on said torsion element fixed to said link, and an anchorage fixed to said torsion element at a point spaced from said link, the combination of a lost motion connection connected to said anchorage, an adjustable element normally fixed in relation to said torsion element, said lost motion connection being also connected to said adjustable element, a relatively stationary locking detent supported adjacent said torsion element, said link providing an opening positioned to register with said detent when said link is positioned in an upwardly directed position to carry said seat support in an upper retracted position, said opening being of a size to substantially secure said link and seat support against movement when engaged with said detent, and means for disengaging said detent from said opening to free said link for swinging movement.

9. In a vehicle seat suspension of the type comprising a standard mounted on the vehicle, a link pivotally mounted on and extending generally forwardly from said standard, a seat support pivotally conected to, and supported on said link for up-and-down movement accompanied by swinging of said link, means for stabilizing said seat support, a torsion element, a portion on said torsion element fixed to said link, an anchorage fixed to said torsion element at a point spaced from said link, the combination of a lost motion connection connected to said anchorage, an adjustable element normally fixed in relation to said torsion element, said lost motion connection being also connected to said adjustable element, a relatively stationary locking detent supported adjacent said link and torsion element, said link providing a slot in which said detent is engaged to limit swinging of said link and thereby limit up-and-down movement of said seat support, means for disengaging said detent from said slot, and said link providing an opening spaced from said slot and positioned to register with said detent when said link is placed in an upwardly directed position to carry said seat support in an upper retracted position, and said opening being of a size to substantially secure said link and seat support against movement when engaged with said detent.

10. In a vehicle seat suspension of the type comprising a standard mounted on the vehicle, a link pivotally mounted on and extending generally forwardly from said standard, a seat support pivotally connected to, and supported on said link for up-and-down movement accompanied by swinging of said link, means for stabilizing said seat support, a torsion element, a portion on said torsion element fixed to said link, and an anchorage fixed to said torsion element at a point spaced from said link, the combination of a lost motion connection connected to said anchorage, an adjustable element normally fixed in relation to said seat support, and said lost motion connection being also connected to said adjustable element.

11. In a vehicle seat suspension of the type comprising a standard mounted on the vehicle, a link pivotally mounted on and extending generally forwardly from said standard, a seat support pivotally connected to, and supported on said link for up-and-down movement accompanied by swinging of said link, means for stabilizing said seat support, a torsion element, a portion on said torsion element fixed to said link, and an anchorage fixed to said torsion element at a point spaced from said link, the combination of a lost motion connection connected to said anchorage, an adjustable element normally fixed in relation to said seat support, said lost motion connection being also connected to said adjustable element, a relatively stationary locking detent supported from said seat support adjacent said link and torsion element, said link providing an opening positioned to register with said detent when said link is positioned in an upwardly directed position to carry said seat support in an upper retracted position, said opening being of a size to substantially secure said link and seat support against movement when engaged with said detent, and means for disengaging said detent from said opening to free said link for swinging movement.

12. In a vehicle seat suspension of the type comprising a standard mounted on the vehicle, a link pivotally mounted on and extending generally forwardly from said standard, a seat support pivotally connected to, and supported on said link for up-and-down movement accompanied by swinging of said link, means for stabilizing said seat support, a torsion element, a portion on said torsion element fixed to said link, and an anchorage fixed to said torsion element at a point spaced from said link, the combination of a lost motion connection connected to said anchorage, an adjustable element normally fixed in relation to said seat support, said lost motion connection being also connected to said adjustable element, a relatively stationary locking detent supported from said seat support adjacent said link and torsion element, said link providing a slot in which said detent is engaged to limit swinging of said link and thereby limit up-and-down movement of said seat support, means for disengaging said detent from said slot, and said link providing an opening spaced from said slot and positioned to register with said detent when said link is placed in an upwardly directed position to carry said seat support in an upper retracted position, and said opening being of a size to substantially secure said link and seat support against movement when engaged with said detent.

13. In a vehicle seat suspension of the type comprising a standard mounted on the vehicle, a link pivotally mounted on and extending generally forwardly from said standard, a seat support pivotally connected to, and supported on said link for up-and-down movement accompanied by swinging of said link, means for stabilizing said seat support, a rubber-like torsion element on said seat support, a portion of said torsion element fixed to said link, an anchorage fixed to said torsion element at a point spaced from said link, means connecting said anchorage to said seat suspension, said rubber-like torsion element being of elongated configuration transversely of said seat support, and having an exposed surface portion, and means on said standard in position to be encountered by said exposed surface portion of said rubber-like torsion element to serve as a cushioned bumper and limit stop for said seat support at the lower limit of said up-and-down movement.

14. In a vehicle seat suspension of the type comprising a standard mounted on the vehicle, upper and lower links pivotally mounted on and extending generally forwardly from said standard, a seat support pivotally connected to, and supported on said links for up-and-down movement accompanied by swinging of said links, a torsion element, a portion on said torsion element fixed to one of said links, and an anchorage fixed to said torsion element at a point spaced from said link, the combination of a lost motion connection connected to said anchorage, an adjustable rockshaft element normally fixed in relation to said seat support, a lever fixed on said rockshaft, said lost motion connection including a link connected to said lever, and a pin and slot connection between said link and said anchorage.

15. In a vehicle seat suspension, means on the vehicle including a parallelogram type of linkage comprising a seat support pivotally connected to a pair of vertically spaced forwardly extending substantially parallel links, a resilient element connected to one of said links and biased to resist downward movement of said links and seat support, and means for anchoring a portion of said resilient element against movement by reason of downward movement of said links, the last mentioned means being constituted to provide for free movement of said portion of said resilient element in the direction caused by upward movement of said seat support and links.

16. In a vehicle seat suspension, means on the vehicle including a parallelogram type of linkage comprising a seat support pivotally connected to a pair of vertically spaced forwardly extending substantially parallel links, a resilient element connected to one of said links and biased to resist downward movement of said links and seat support, and means for anchoring a portion of said resilient element against movement by reason of downward movement of said links, the last mentioned means being constituted to provide for free movement of said portion of said resilient element in the direction caused by upward movement of said seat support and links, and means for locking said linkage and seat support in an upwardly disposed position achieved by said free upward movement.

17. In a vehicle seat suspension a parallelogram linkage, a seat support carried on said parallelogram linkage for up-and-down movement, a torsion element connected with said linkage, an anchorage on said torsion element, said anchorage being adjustable to change the torsion in said torsion element, a hand lever on said seat support positioned for predominantly up-and-down movement relative to said seat support, detent means engaged with said hand lever and with said seat support, means connected to said hand lever and to said anchorage for adjusting said anchorage by reason of movement of said hand lever, said detent means having another position securing said hand lever in a raised position for increasing the torsion in said torsion element, and still another position securing said hand lever in a lowered position for relaxing the torsion in said torsion element.

18. In a vehicle seat suspension of the type comprising a standard mounted on the vehicle, upper and lower generally horizontal links pivotally mounted on said standard, a seat support pivotally connected to, and supported on said links for up-and-down movement accompanied by swinging of said links, a torsion element, a portion of said torsion element fixed to one of said links and an anchorage fixed to said torsion element at a point spaced from said link, the combination of a lost motion connection connected to said anchorage, an adjustable rockshaft element journaled on said seat support, a hand lever fixed on said rockshaft for up-and-down swinging movement, a detent portion on said hand lever, a rack on said seat support positioned to engage with said detent portion in one position of said hand lever, a second lever fixed on said rockshaft element, said lost motion connection including a link connected to said second lever and a pin and slot connection between said link and said anchorage, and said hand lever having another position wherein it is engaged with said rack above the aforementioned position, to increase the torsion in said torsion element, and said hand lever having still another position below said aforementioned position to relax the torsion in said torsion element, whereby for an operator of a given weight, upward movement of said hand lever will tend to raise said seat and downward movement of said hand lever will tend to lower said seat.

19. In a seat suspension for a vehicle of the type having a platform, means on the vehicle providing a standard, a pair of vertically spaced forwardly extending substantially parallel links pivotally mounted on said standard for up-and-down swinging movement, a rearwardly open box-like seat support within which said links are pivoted at their forward ends in supporting relation to said seat support, said links being arranged to guide said seat support in a normal range of up-and-down movement for cushioning shocks, and said links being swingable to guide said seat support into an upper retracted position, a seat on said seat support, resilient means connected with said seat suspension in position to exert an upward supporting force on said support in said normal range of up-and-down movement, adjusting means in said seat support for varying said upward supporting force at will, including an anchorage for said resilient means comprising a lost motion connection engaged with said resilient means and with said adjusting means whereby said seat support may be swung into said retracted position without interference from said resilient means, to provide standing room on said platform in front of said seat support, and said seat and said box-like seat support presenting a safe and smooth surface toward an operator standing on said platform.

20. In a seat suspension for a vehicle of the type having a platform, means on the vehicle providing a standard, a pair of vertically spaced forwardly extending substantially parallel links pivotally mounted on said standard for up-and-down swinging movement, a rearwardly open box-like seat support within which said links are pivoted at their forward ends in supporting relation to said seat support, said links being arranged to guide said seat support in a normal range of up-and-down movement for cushioning shocks, and said links being swingable to guide said seat support into an upper retracted position, a seat on said seat support, resilient means connected with said seat suspension in position to exert an upward supporting force on said support in said normal range of up-and-down movement, adjusting means in said seat support for varying said upward supporting force at will, including an anchorage for said resilient means comprising a lost motion connection engaged with said resilient means and with said adjusting means whereby said seat support may be swung into said retracted position without interference from said resilient means, to provide standing room on said platform in front of said seat support, means engaged with one of said links for locking said seat support in said retracted position, and said seat and said box-like seat support presenting a safe and smooth surface toward an operator standing on said platform.

References Cited by the Examiner
UNITED STATES PATENTS

| 2,534,386 | 12/50 | Stewart | 248—371 |
| 2,604,927 | 7/52 | Bonnesen | 248—371 |
| 2,652,880 | 9/53 | Gundersen | 248—399 |
| 2,667,209 | 1/54 | Gundersen | 248—399 |
| 2,815,064 | 12/57 | Witzel | 248—371 |
| 2,949,153 | 8/60 | Hickman | 248—399 |

FOREIGN PATENTS

| 985,867 | 3/51 | France. |

CLAUDE A. LE ROY, *Primary Examiner.*